(12) United States Patent
Goettfert et al.

(10) Patent No.: US 8,879,733 B2
(45) Date of Patent: *Nov. 4, 2014

(54) RANDOM BIT STREAM GENERATOR WITH GUARANTEED MINIMUM PERIOD

(75) Inventors: Rainer Goettfert, Putzbrunn (DE); Berndt Gammel, Markt-Schwaben (DE); Markus Gail, Munich (DE)

(73) Assignee: Infineon Technologies AG, Neubiberg (DE)

( * ) Notice: Subject to any disclaimer, the term of this patent is extended or adjusted under 35 U.S.C. 154(b) by 23 days.

This patent is subject to a terminal disclaimer.

(21) Appl. No.: 13/545,564

(22) Filed: Jul. 10, 2012

(65) Prior Publication Data

US 2014/0016778 A1 Jan. 16, 2014

(51) Int. Cl.
*G06F 21/00* (2013.01)
*H04L 9/22* (2006.01)
*G06F 7/58* (2006.01)

(52) U.S. Cl.
USPC .............................................. 380/255; 380/44

(58) Field of Classification Search
None
See application file for complete search history.

(56) References Cited

U.S. PATENT DOCUMENTS

| | | | |
|---|---|---|---|
| 4,654,480 A | 3/1987 | Weiss | |
| 4,815,130 A | 3/1989 | Lee et al. | |
| 4,860,353 A * | 8/1989 | Brown | 380/44 |
| RE36,181 E | 4/1999 | Koopman, Jr. et al. | |
| RE36,752 E | 6/2000 | Koopman, Jr. et al. | |
| 6,891,952 B1 | 5/2005 | Puehlhoefer et al. | |
| 2005/0041803 A1* | 2/2005 | Chateau et al. | 380/46 |
| 2005/0120065 A1* | 6/2005 | Dirscherl et al. | 708/250 |
| 2007/0230694 A1* | 10/2007 | Rose et al. | 380/46 |
| 2007/0244951 A1* | 10/2007 | Gressel et al. | 708/252 |
| 2009/0204656 A1* | 8/2009 | Goettfert et al. | 708/252 |
| 2009/0316898 A1* | 12/2009 | Omar et al. | 380/255 |
| 2010/0142705 A1* | 6/2010 | Reffe | 380/46 |
| 2014/0040338 A1 | 2/2014 | Van Der Sluis et al. | |

OTHER PUBLICATIONS

Killmann, Wolfgang. "Update of German Guidance for RNG Evaluation". Presentation Slides of Presentation on Sep. 23, 2009 during 10th ICCC, Tromsø, Norway, Sep. 22-24, 2009.

"Bekanntmachung zur elektronischen Signatur nach dem Signaturgesetz und der Signaturverordnung", Bundesnetzagentur für Elektrizität, Gas, Telekommunikation, Post und Eisenbahnen (German Federal Network Agency), Draft of Sep. 28, 2011, Version of Dec. 30, 2011 published Jan. 18, 2012 in Bundesanzeiger (German Federal Gazette) Nr. 10, p. 243.

(Continued)

*Primary Examiner* — Gilberto Barron, Jr.
*Assistant Examiner* — Malcolm Cribbs
(74) *Attorney, Agent, or Firm* — Murphy, Bilak & Homiller, PLLC

(57) ABSTRACT

A random bit stream generator includes an internal state memory for storing a current internal state of the random bit stream generator and a periodic bit sequence generator configured to provide a periodic bit sequence. An output function receives a bit sequence portion of the periodic bit sequence and a first internal state portion of the current internal state. A new output bit of the random bit stream is determined, by the output function, based on a Boolean combination of the bit sequence portion and the first internal state portion. A feedback arrangement feeds the new output bit back to the internal state memory by performing a Boolean combination involving the new output bit and a second internal state portion of the current internal state to determine a next internal state of the random bit generator.

23 Claims, 10 Drawing Sheets

(56) References Cited

OTHER PUBLICATIONS

"Anwendungshinweise und Interpretationen zum Schema (AIS)", Bundesamt für Sicherheit in der Informationstechnik (German Federal Office for Information Security), AIS 20, Version 2.1, Dec. 2, 2011. pp. 1-5.

Paar, Christof et al. Understanding Cryptography: A Textbook for Students and Practitioners. Chapters 1-3. New York: Springer-Verlag, 2010.

Brown, Lawrie. "Cryptography—Lecture 12—Modern Stream Ciphers" CCS3 Lecture. UNSW, Canberra. Nov. 7, 2001. pp. 1-16.

* cited by examiner 510 stream cipher in keystream mode 780 stream cipher in keystream feedback mode

RANDOM BIT STREAM GENERATOR WITH GUARANTEED MINIMUM PERIOD

FIELD OF INVENTION

Embodiments of the present invention relate to a random bit stream generator. Further embodiments of the present invention relate to a method for generating a random bit stream. Further embodiments of the present invention relate to a computer readable digital storage medium having stored thereon a method for generating a random bit stream. Further embodiments of the present invention relate to an apparatus and a method for avoiding small periods for Stream Cipher based Pseudorandom number generators in keystream feedback mode.

BACKGROUND

A hybrid random number generator typically comprises a true random number generator (TRNG) and a cryptographic post processing. The true random number generator exploits a physically unpredictable effect (radioactive decay, thermal noise, jitter in oscillators, etc.) to generate random numbers. Typically, the physical random processes are digitized and a random bit sequence is obtained. This random bit sequence is typically termed raw data sequence. The raw data is typically further subjected to a mathematical post-processing in order to smooth certain technology-related effects, such as a bias, i.e., an imbalance of zeros and ones. The result is a random (bit) sequence that is used for applications (e.g., for the generation of cryptographic keys).

In the case of a hybrid random number generator, a cryptographic post-processing is connected downstream of the true random number generator.

SUMMARY

Embodiments of the present invention provide a random bit stream generator for generating a random bit stream. The random bit stream generator comprises an internal state memory configured to store a current internal state of the random bit stream generator and a periodic bit sequence generator configured to provide a periodic bit sequence. The random bit stream generator further comprises an output function configured to receive a bit sequence portion of the periodic bit sequence and a first internal state portion of the current internal state, and to determine a new output bit of the random bit stream on the basis of a Boolean combination of the bit sequence portion and the first internal state portion. The random bit stream generator also comprises a feedback arrangement configured to feed the new output bit back to the internal state memory by performing a Boolean combination involving the new output bit and a second internal state portion of the current internal state to determine a next internal state of the random bit generator.

Further embodiments of the present invention provide a random bit stream generator for generating a random bit stream which comprises a plurality of feedback shift registers. Each feedback shift register comprises an input bit, an output bit, and a feedback function linking a portion of the bits of the feedback shift register to the input bit. The plurality of feedback shift registers thus provides a plurality of input bits, a plurality of output bits, and a plurality of feedback functions. The random bit stream generator further comprises an output function configured to receive a plurality of output bit values from the plurality of output bits, and to determine a new bit stream value on the basis of the plurality of output bit values. The random bit stream generator also comprises a feedback arrangement configured to provide the new bit stream value to the feedback function of at least one of the plurality of feedback shift registers as an additional input, but not to the feedback function of at least one other feedback shift register of the plurality of feedback shift registers.

Further embodiments of the present invention provide a random bit stream generator for generating a random bit stream. The random bit stream generator comprises means for storing an internal state of the random bit stream generator; means for generating a periodic bit sequence; means for determining a new output bit of the random bit stream on the basis of a Boolean combination of the periodic bit sequence and a first portion of the internal state; and means for feeding the new output bit back to the means for storing the internal state by performing a Boolean combination involving the new output bit and a second portion of the internal state.

Further embodiments of the present invention provide a method for generating a random bit stream. The method comprises providing a periodic bit sequence and determining a new output bit of the random bit stream. The new output bit of the random bit stream is determined on the basis of a Boolean combination of a bit sequence portion of the periodic bit sequence and a first internal state portion of a current internal state of the method for generating a random bit stream. The method further comprises performing a Boolean combination involving the new output bit and a second internal state portion of the internal state to determine a next internal state of the method for generating a random bit sequence.

Further embodiments of the present invention provide a method for generating a random bit stream, the method comprising: receiving a plurality of output bit values from a plurality of feedback shift registers and determining a new bit stream value of the random bit stream on the basis of the plurality of output bit values. The method further comprises providing the new bit stream value as an additional input for a feedback function of at least one of the plurality of feedback shift registers, but not to a feedback function of at least one other of the plurality of feedback shift registers.

Further embodiments of the present invention provide a computer readable digital storage medium having stored thereon a computer program having a program code for performing, when running on a computer, a method for generating a random bit stream as described in either one of the two preceding paragraphs.

BRIEF DESCRIPTION OF THE FIGURES

Embodiments of the present invention will be described using the accompanying figures, in which.

DETAILED DESCRIPTION

Before in the following embodiments of the present invention will be described in detail using the accompanying figures, it is to be pointed out that the same elements or elements having the same functionality are provided with the same or similar references numbers and that a repeated description of elements provided with the same or similar reference numbers is typically omitted. Hence, descriptions provided for elements having the same or similar reference numbers are mutually exchangeable. In the following description, a plurality of details are set forth to provide a more thorough explanation of embodiments of the present invention. However, it will be apparent to one skilled in the art that embodiments of the present invention will be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Figure 1:
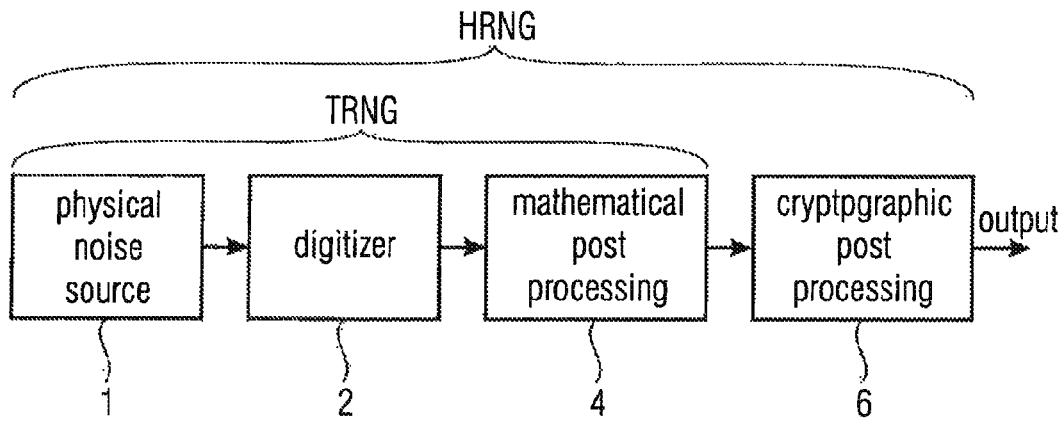
FIG. 1 is a schematic block diagram of a hybrid random number generator (HRNG)

FIG. 1 shows a schematic block diagram of a hybrid random number generator (HRNG). The HRNG comprises a physical noise source 1, a digitizer 2, a mathematical post-processing 4, and a cryptographic post-processing 6. The physical noise source 1, the digitizer 2, and the mathematical post-processing 4 are typically part of a true random number generator (TRNG). All four boxes, i.e., the physical noise source 1, the digitizer 2, the mathematical post-processing 4, and the cryptographic post-processing 6 represent the hybrid random number generator (HRNG).

When implemented in hardware, the implementation of the cryptographic algorithm that realizes the cryptographic post-processing typically requires a major portion of the area.

The rate at which the true random bits are input into the cryptographic post-processing 6 may be variable. At a rate of, for example, 5:1 the cryptographic post-processing 6 functions as a compressor for the true random bits. The rate may be 1:1 in which case the cryptographic post-processing 6 functions as a scrambler for the true random bits. The rate may even be as high as, for example, 1:512 in which case the cryptographic post-processing 6 has a property as expander. In the latter case, the hybrid RNG thus enhances the performance of the RNG: during the same time span more random numbers are provided for an application by the HRNG than the TRNG alone would be capable of.

As random number generators (RNGs) are incorporated into many products and play an important role in numerous cryptographic applications, they are often also subjected to evaluation by standardization bodies, governmental authorities, and/or other organizations that define minimum standards which need to be fulfilled by random number generators. A relatively newly added requirement is the so-called "enhanced backward secrecy" (also termed "backtracking resistance") which may be understood as follows. Let us assume that the TRNG has failed and that the cryptographic post-processing continues to run in an autonomous manner. In doing so, the cryptographic post-processing produces pseudo random numbers. Assume that r1, r2, r3, . . . is the bit sequence produced by the cryptographic post-processing (i.e., the pseudo random sequence). The cryptographic post-processing 6 has a memory on the order of typically some hundred bit. The content of this memory at a time instant t is called the internal state of the cryptographic algorithm at the time instant t and is designated herewith $S_t$. By means of an output function, the output bit $r_t$ is calculated at the time instance t from the internal state $S_t$, i.e., the t-th pseudo random bit. Subsequently, the internal state $S_t$ transitions to the subsequent state $S_{t+1}$—by executing a "next-state-function". From $S_{t+1}$ the output bit $r_{t+1}$ is calculated, and so forth.

Figure 2:
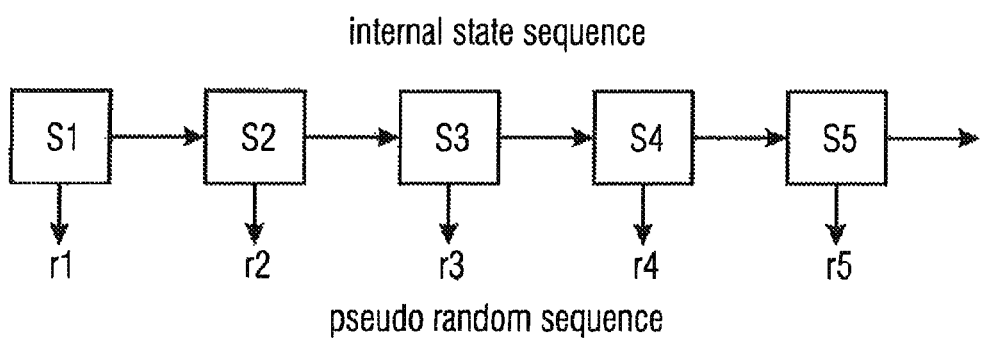
FIG. 2 is a schematic illustration of an operation of a cryptographic post-processing.

When the cryptographic post-processing 6 functions in an autonomous manner (and thus constitutes a pseudo random number generator, also called deterministic random number generator), a (quasi invisible) internal state sequence $S_1$, $S_2$, $S_3$, . . . is generated which in turn provides the pseudo random sequence $r_1$, $r_2$, $r_3$, . . . . This is schematically illustrated in FIG. 2.

Backward secrecy (i.e. regular backward secrecy) means: when an attacker knows all the pseudo random bits (or a large number of these bits) generated after the time instant t, the attacker must not be able to calculate previously generated pseudo random bits. In other words, even if the attacker knows, for example, the pseudo random bits $r_{1000}$, $r_{1001}$, $r_{1002}$, . . . , $r_{5000}$, he must not be able to calculate the bit $r_{999}$. Typically, each reasonable cryptographic algorithm processes this property.

The enhanced backward secrecy is a more stringent requirement than the backward secrecy: assume that the attacker knows all pseudo random bits generated after the time instant t and in addition also the internal state $S_t$ at the time instant t. According to the concept of enhanced backward secrecy, the attacker should not be able to determine previously generated pseudo random bits. In general, a cryptographic algorithm does not exhibit this property. The philosophy behind the design of a cryptographic algorithm is almost always that the internal state is secret. Indeed, the following holds true for most cryptographic algorithms: a cryptographic algorithm is regarded as broken when one has calculated the cryptographic key (key recovery attack) or when one has calculated the internal state (state recovery attack).

Accordingly, a crypto algorithm needs to be extended, upgraded or modified so that it exhibits the required property of "enhanced backward secrecy". This property means the following:

it is assumed that the input from the TRNG is deactivated an attacker knows the internal state at a time instant t When it is impossible, even under these assumptions, to determine previously (i.e., prior to the time instant t) generated output bits, then the algorithm of cryptographic post-processing has the property of enhanced backward secrecy. Stream cipher typically do not have the property of enhanced backward secrecy in their normal mode of operation (the so-called keystream mode").

However, certain stream cipher do indeed have this property in the so-called keystream feedback mode. Typically, the keystream feedback mode is used for a short period of time, only, namely during the key-loading phase.

When a stream cipher is operated in the keystream mode (this is the normal case), then it can only generate a finite bit sequence which repeats itself over and over again. Given a reasonable stream cipher the length of this finite, repetitive bit sequence is, however, provably very long. For this reason, one will typically never, in practice, use the entire finite sequence (also termed "period").

Yet, this important property of a stream cipher is typically lost (or at least not provable anymore) when the stream cipher is operated in keystream mode. Hence, small periods may, in principle, occur in the keystream feedback mode.

Example: Assume that in a hybrid random number generator (HRNG) there is momentarily no input from the true random number generator (TRNG), for example because the TRNG has failed or because the cryptographic post-processing is currently in a phase in which it does not receive any TRNG input). The cryptographic post-processing hence runs in an autonomous manner and output further bits. The output bit sequence shall be a good pseudo random sequence that fulfills ample statistical tests regarding randomness. When an apparatus or hybrid random number generator now produces a small period, e.g., 01011 01011 01011 ..., then this would be an unacceptable situation.

Therefore, it would be desirable to define an extension to the keystream feedback mode that guarantees a minimum period length, e.g. of the order of 2^30.

One example of a cryptographic algorithm is the advanced encryption standard (AES). This is a 128 bit block cipher. Input and output have 128 bits, i.e., a 128-bit block of input data is encrypted in a block-wise manner and produces a 128-bit block of output data (the employed key length is typically 128 bit, too).

Figure 3:
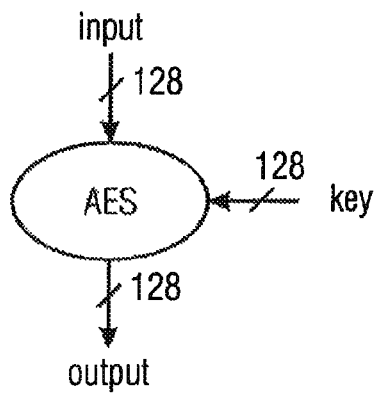
FIG. 3 illustrates input and output of a block cipher, in particular according to the Advanced Encryption Standard (AES)

FIG. 3 schematically illustrates the AES encryption of a 128-bit block of input data with a 128-bit key to obtain a 128-bit block of output data.

When the advanced encryption standard is used as a cryptographic post-processing in a hybrid RNG, the AES needs to be used several times in order to obtain the property of enhanced backward secrecy. This is schematically illustrated in block diagram form in FIG. 4.

The internal state comprises two 128-bit blocks 412, 414 at a time instant n. The first block 412 contains the state $S1(n)$ and the second block 414 contains the second state $S2(n)$. The first state $S1(n)$ is provided as an input to a first AES instance 422 and as a key to a second AES instance 424. The second state $S2(n)$ is provided as an input to the second AES instance 424 and as a key (dotted line) to the first AES instance 422. Furthermore, the first state $S1(n)$ is also XOR-combined with the 128 bit output of the first AES instance 422 by means of a 128-bit XOR function 432. Likewise, the second 128-bit block of the internal state $S2(n)$ is XOR-combined with the output of the second AES instance 424 by means of a second 128-bit XOR-function 434. At an output of the first XOR-function 432, the first block $S1(n+1)$ 442, i.e., a first half of the next internal state at time n+1, is obtained. At an output of the second XOR-function 423 the second block $S2(n+1)$ 444 of the internal state at time n+1 is obtained. In this manner, the "next state function" is implemented by means of the components 422, 432, 424 and 434.

In order to determine the output of the hybrid RNG, the first 128-bit block $S1(n)$ 412 and the second 128-bit block $S2(n)$ 414 are XOR-combined by means of a XOR-function 455. An output of the XOR-function 455 is provided as a key to a further AES instance 457 that receives the second 128-bit block $S2(n)$ as an input. The second 128-bit block $S2(n)$ is also provided to an XOR-function 459 in order to be XOR-combined with an output of the further AES instance 457. The output of the hybrid RNG is then available at an output of the 128-bit XOR-function 459.

Figure 4:
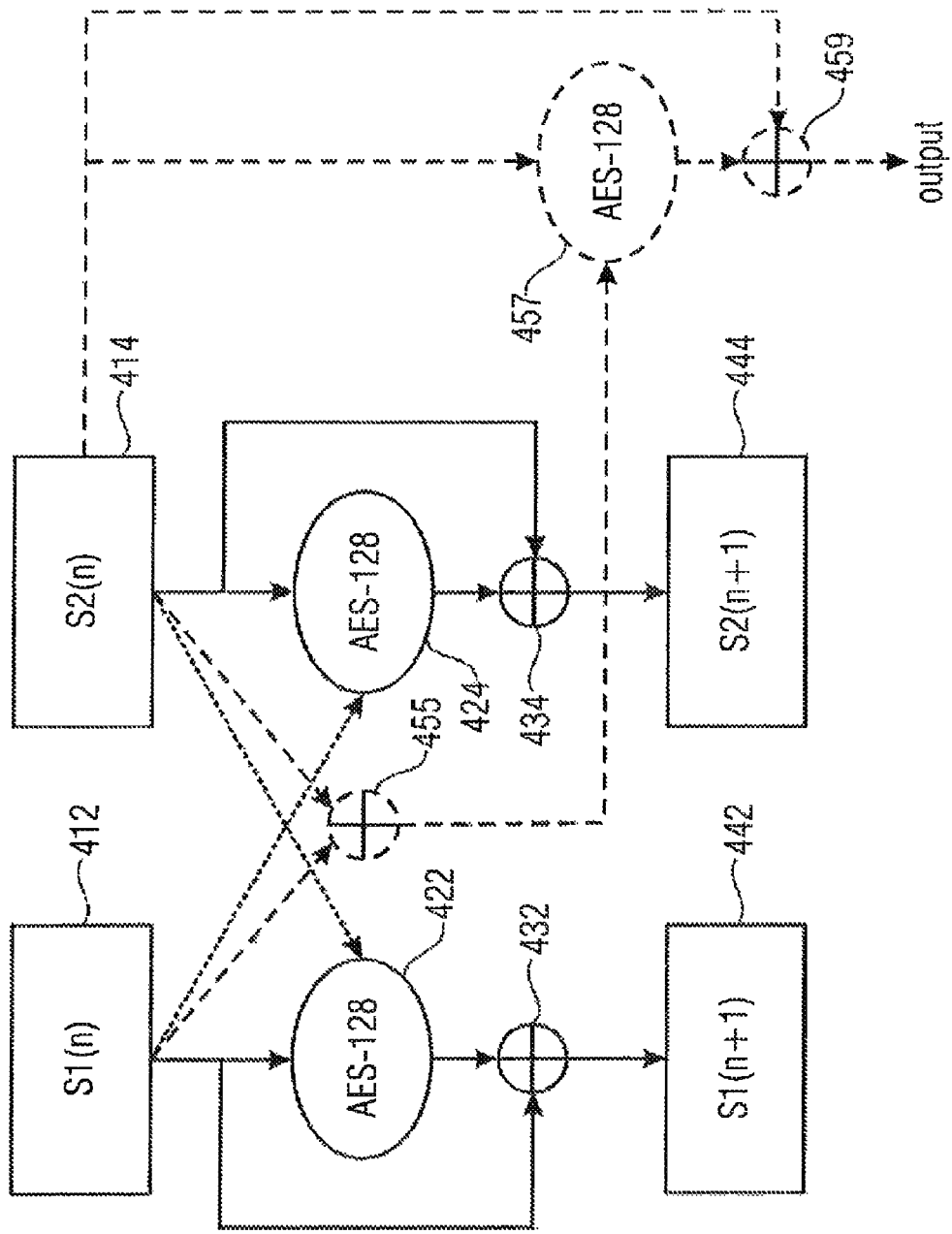
FIG. 4 illustrates a schematic block diagram of a cryptographic post-processing for a hybrid RNG using several instances of the AES.

FIG. 4 may be summarized as follows. The oval shape symbolizes the AES-algorithm. The arrow arriving from the top symbolizes the input (corresponding to the plain text). The arrow to the bottom provides the output (corresponding to the cipher text). The arrow arriving from the side symbolizes the employed AES key. The four rectangles symbolize artificially created memories. Each of the four memories contains a 128 bit entry. The two upper boxes 412, 414 represent the internal state at the time instant n. Hence, the internal state has 256 bit. The two lower boxes 442, 444 correspond to the internal state at the time instant n+1. The internal stage at the time instant n+1 has 256 bits, as well.

The two AES instances 422, 424 implement the next-state-function of the crypto algorithm. The AES instance 457 drawn in a dashed line implements the output function of the crypto algorithm.

Accordingly, a larger crypto algorithm has been created by means of the AES. This larger algorithm possesses the property of enhanced backward secrecy, whereas a simple AES-based crypto algorithm as, for example, illustrated in FIG. 3, typically does not possess the property of enhanced backward secrecy.

Note that the AES algorithm itself does not possess an internal state. For this reason, an internal state needs to be created in an artificial manner. The AES is a block cipher.

Besides the class of block ciphers, the class of so-called stream ciphers exists. A stream cipher typically (or always) possesses an internal state (internal secret state).

The solution schematically illustrated in FIG. 4 typically requires a large area and has a high power consumption. Furthermore, the hybrid RNG schematically illustrated in FIG. 4 has a 128-bit granularity. Even when, for example, only 16 random bits are needed, 128 random bits inevitably have to be generated.

As an alternative to a block cipher, a stream cipher may be used as a crypto algorithm in a hybrid RNG. Stream ciphers produce the output bits typically in a bitwise manner (bit granularity).

Figure 5:
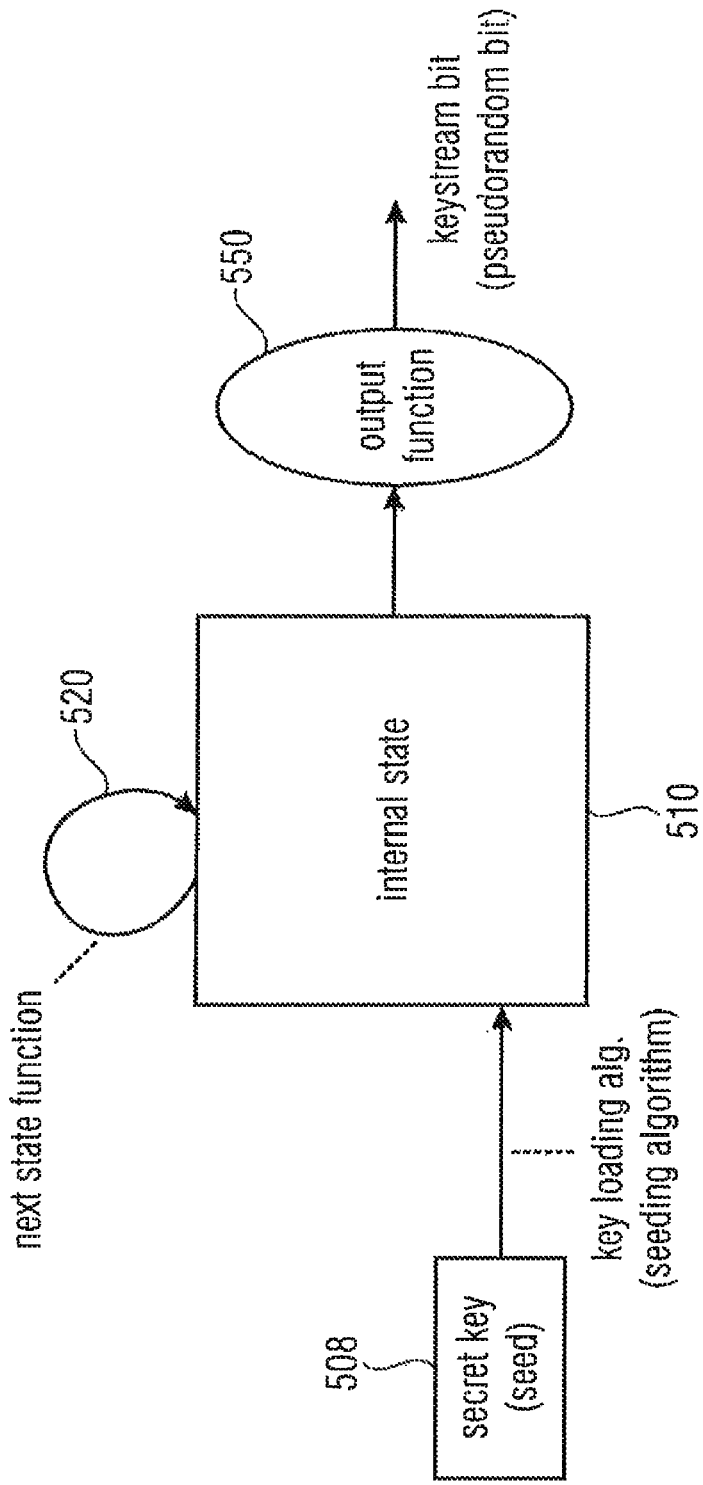
FIG. 5 shows a schematic block diagram of a stream cipher.

FIG. 5 shows a schematic illustration of a stream cipher which will be used to describe some basic terminology of stream ciphers. The stream cipher comprises, or is based on, an internal state 510, a next state function 520 and an output function 550. By means of the next state function 520 the internal state 510 is updated. The next state function 520 receives as an input the internal state at a time instant t and produces as an output the internal state at a time instant t+1. In other words, $S_{t+1}$ is generated out of $S_t$.

For each time instant t the output function 550 generates the output bit $r_t$ out of the internal state $S_t$ 510. Accordingly, the output function 550 takes as an input the internal state $S_t$ 510 (which typically is some hundred bit big) and therefrom produces the single bit $r_t$. This single bit $r_t$ is called "keystream bit" in case the stream cipher is used for encryption. In case the stream cipher is used as a pseudo random number generator, the single bit $r_t$ is called a pseudo random bit (NB: each stream cipher is typically a pseudo random number generator. However, not every pseudo random number generator is suitable to be used as a stream cipher).

Initially, the internal state 510 is empty. The state is loaded with a secret key. In this manner $S_0$ is created, the initial state or initial internal state. In principle it is possible to assign the key bits directly to the memory cells in the initial internal state. More frequently, however, the key is introduced in a different manner, by execution of a so-called "key loading algorithm".

Using a stream cipher, a long keystream (which may be approximately 2^40 or 2^64 bit long or even longer) is generated out of a short key (e.g., 256 bit).

When using the same algorithm not as a stream cipher but as a pseudo random number generator, the key is instead called a "seed", the key loading algorithm is instead called a "seeding algorithm" and the keystream is instead called "pseudo random sequence".

Also for stream ciphers the statement holds that they do not, in general, have the property of "enhanced backward secrecy". The modification described below brings about the property of enhanced backward secrecy for (some) stream ciphers.

Figure 6:
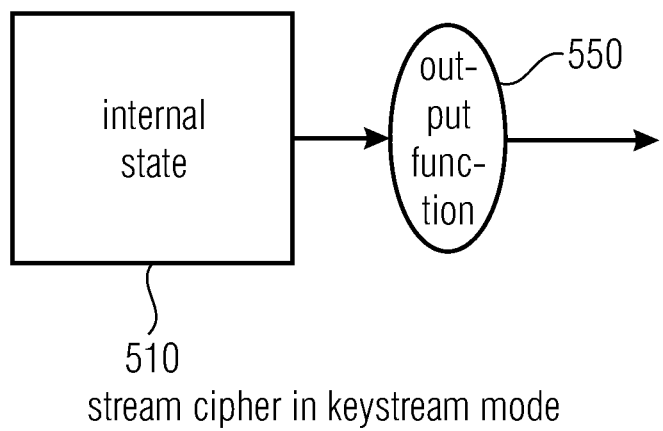
FIG. 6 schematically illustrates a stream cipher in keystream mode.

Consider FIG. 6 which schematically illustrates a stream cipher in the so-called keystream mode. The internal state already has been initialized. Now the algorithm runs without input and permanently produces key bits. The property of backward secrecy is given but—in general—not the property of an enhanced backward secrecy.

Figure 7:
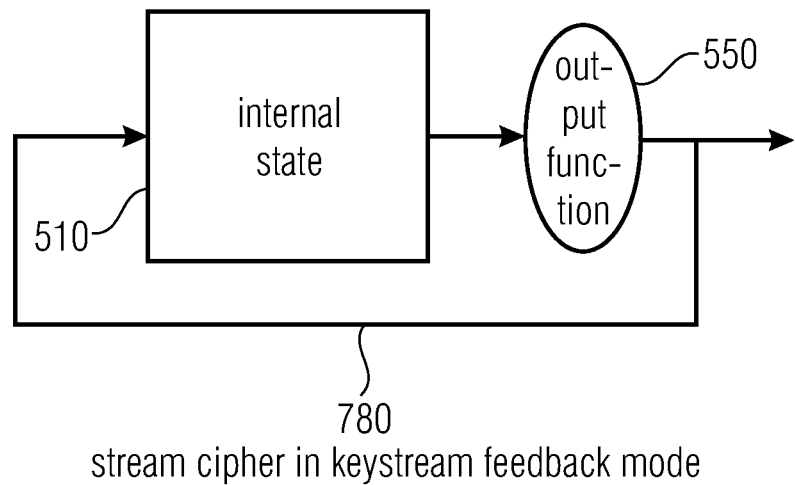
FIG. 7 schematically illustrates a stream cipher in keystream feedback mode.

FIG. 7 shows a schematic block diagram of a general stream cipher in the so-called keystream feedback mode. Again, the apparatus runs in an autonomous manner (no external input; the apparatus has already been initialized). The produced keystream is used completely or partially. Concurrently the keystream is permanently fed into the internal state in the same manner—or a similar manner—as in the beginning the seed has been fed in. This is achieved by means of a feedback loop 780 which connects an output of the (Boolean) output function 550 with an input of the internal state memory 510 which is, e.g., a plurality of feedback shift registers.

With some stream ciphers this results in the property of enhanced backward secrecy to be created. Accordingly, a stream cipher may be operated in keystream feedback mode in a permanent manner when the stream cipher is employed as a cryptographic post-processing in a hybrid RNG for which the property of enhanced backward secrecy is required.

Remark 1: A large number and very differently defined stream ciphers exist. Whether the property of enhanced backward secrecy can be obtained therefore also depends on the type of the stream cipher and/or its definition.

Remark 2: There are stream ciphers (which are, however, assumed to be an exception) for which the keystream feedback mode leads to the internal state $S_t$ having several, e.g., two predecessor internal states $S_{t-1}$ and $S'_{t-1}$, due to the action of feeding back the keystream. Actually, this property is not undesired. Ambiguity with respect to the past in any event supports the sought property of enhanced backward secrecy. However, as a consequence of the ambiguity the internal state also loses entropy. For this reason, these stream ciphers need to be precisely analyzed in keystream feedback mode. When they permanently lose entropy they may be operated for short durations of time, only. Then, new entropy needs to be reloaded from the TRNG (remember that the stream cipher may be part of a hybrid RNG). In other words, these stream ciphers may be operated at a small expansion rate, only. There internal state needs to be supplied with fresh entropy (from the TRNG) in a timely manner.

Remark 3: For most stream ciphers the property of enhanced backward secrecy in keystream feedback mode is obtained by the creation of a sort of hash function (one-way function). This means that the predecessor internal state is, on the one hand, unambiguously (unequivocally) determined but, on the other hand, practically difficult to calculate. More precisely, it may be sufficient that those bits of the predecessor internal states are difficult to calculate which form the input for the stream cipher output function (reference sign 550 in FIGS. 5 to 7).

Figure 8:
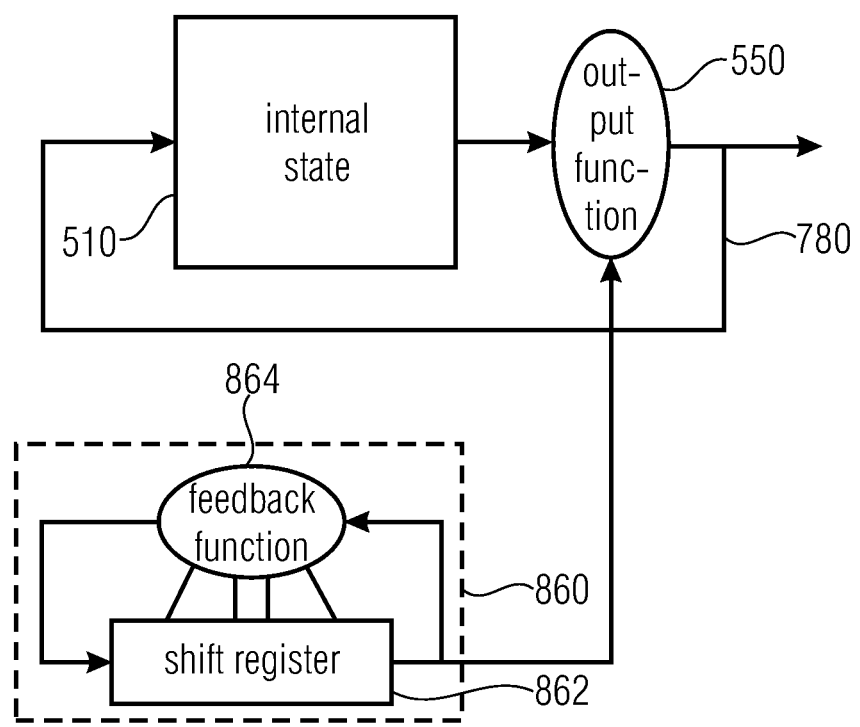
FIG. 8 schematically illustrates a random bit stream generator according to embodiments.

Turning to FIG. 8 now, according to at least some embodiments, a "period guaranteerer" may be added to the circuit shown in FIG. 7. This "period guaranteerer" may be, for example, a linear or non-linear feedback shift register that produces a sequence of long periods. The output sequence of this shift register is then considered as an additional input for the output function. The entire circuit extended in this manner cannot produce a smaller period than the period of the shift register sequence. In particular, shift registers with a length N that produce a period of length 2^N or 2^N−1 lend themselves for producing the additional sequence.

FIG. 8 shows a schematic block diagram of a random bit stream generator which may be used as a stream cipher or as a deterministic random number generator. The random bit stream generator comprises the internal state memory 510 which is configured to store a current internal state of the random bit stream generator. The random bit stream generator further comprises a periodic bit sequence generator 860 which is configured to provide a periodic bit sequence to be used as the additional input for the output function 550. The output function 550 is configured to receive a bit sequence portion of the periodic bit sequence from the periodic bit sequence generator 860. The output function 550 is further configured to receive a first internal state portion of the current internal state from the internal state memory 510. The bit sequence portion which is provided by the periodic bit sequence generator 860 to the output function 550 may be a single bit or a short sequence of several bits of a specified length. As another option, the periodic bit sequence generator 860 may produce two or more parallel periodic bit sequences which are both (or all) fed to the output function 550 in parallel. The output function then determines a new output bit of the random bit sequence on the basis of a Boolean combination of the bit sequence portion and the first internal state portion.

In the embodiment that is schematically illustrated in FIG. 8, the periodic bit stream generator 860 is a feedback shift register. Accordingly, the feedback shift register comprises the actual shift register 862 and a feedback function 864 for feeding back selected bit values of the feedback shift register 862 to the input of the same.

The random bit stream generator shown in FIG. 8 further comprises a feedback arrangement 780 which is configured to feed the new output bit of the random bit stream back to the internal state memory 510 by performing a Boolean combination involving the new output bit and a second internal state portion of the current internal state to determine a next internal state of the random bit stream generator.

Other than the solution that is illustrated in FIG. 8, a more specific solution is described in connection with further embodiments according to FIGS. 11 to 13. In preparation for the description of these embodiments, FIGS. 9 and 10 and the corresponding description provide some explanations regarding random bit stream generators and, in particular, stream ciphers.

Figure 9:
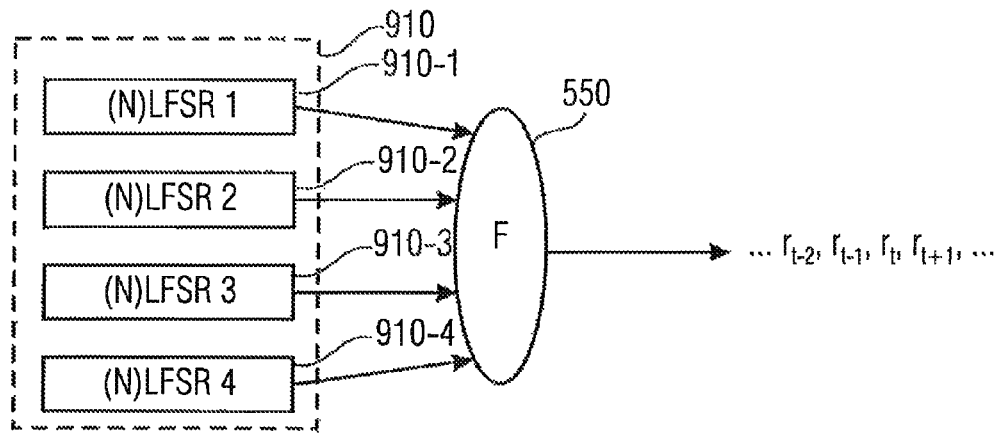
FIG. 9 schematically illustrates a feedback shift register-based stream cipher in keystream mode.

FIG. 9 schematically illustrates a classical stream cipher comprising several linear or non-linear feedback shift registers 910-1 to 910-4 and a Boolean combination function 550. The feedback shift registers 910-1 to 910-4 form the internal state memory 910. The shift registers are loaded in the beginning (e.g., with a cryptographic key or a seed). Subsequently, they run in an autonomous manner (i.e., without further input in the form of a cryptographic key or a seed). Each shift register produces an output sequence. These output sequences are fed into the Boolean combination function 550, which on this basis produces a single sequence, namely the random bit stream ... $r_{t-2}, r_{t-1}, r_t, r_{t+1}, ...$ Instead of linear feedback shift registers (LFSRs), non-linear feedback shift registers (NLFSRs) may also be used.

Note that for most real life applications the number of four feedback shift registers 910-1 to 910-4 is, however, unrealistically low.

Figure 10:
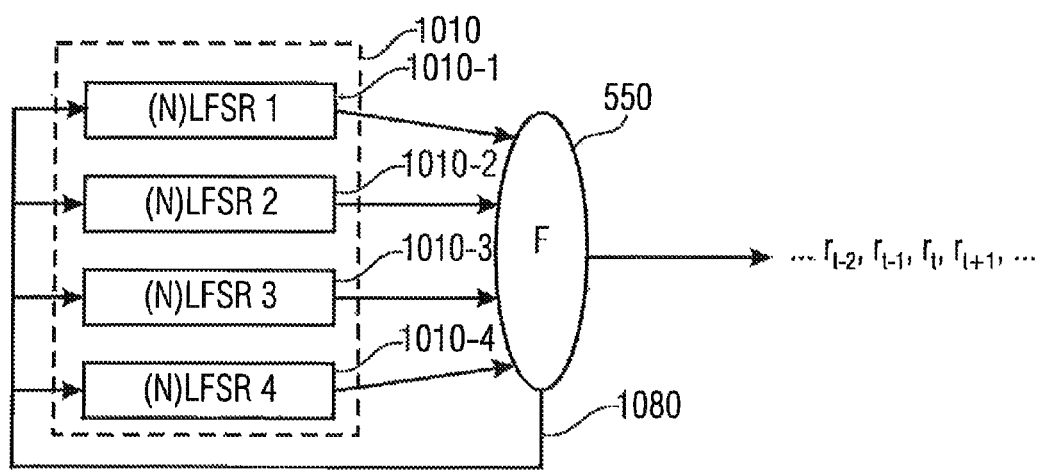
FIG. 10 schematically illustrates a feedback shift register-based stream cipher in keystream feedback mode.

The classical stream cipher in keystream feedback mode is schematically illustrated in FIG. 10. The internal state (or internal state memory) 1010 comprises several linear or non-linear feedback shift registers (N)LFSRs 1010-1, 1010-2, 1010-3 and 1010-4 (in the depicted case four (N)LFSRs). The feedback functions of the LFSRs are not shown in FIG. 10 for lack of space. The different (N)LFSRs may have different lengths. The cells of all (N)LFSRs together 1010-1 to 1010-4 (e.g., all flip flops) make up the internal state.

The next state function is implemented by switching all shift registers 1010-1 to 1010-4 concurrently by one clock period. The content of the foremost cell of each shift register is fed to the Boolean combination function 550. The Boolean combination function (Boolean output function) 550 produces from its four input bits one output bit, i.e., the keystream bit or the pseudo random bit $r_t$.

The last cell of each shift register receives a new value. This new value may be, for example, the sum (modulo 2, i.e., XOR) of the keystream bit $r_t$ and the respective feedback value of each single shift register. The keystream bit $r_t$ is fed back to the plurality of (N)LFSRs 1010-1 to 1010-4 via a feedback arrangement 1080.

Note that except for the foremost cell contents (which are output from the shift registers 1010-1 to 1010-4 and further processed by the Boolean combination logic 550) all other cell contents have only been shifted. With respect to the enhanced backward secrecy this means that an attacker who knows the internal state $S_t$ at the time instant t also knows a major portion of the predecessor internal state $S_{t-1}$. Only four cells of the predecessor internal state $S_{t-1}$ are unknown to the attacker. However, this does not contradict the required property of enhanced backward secrecy. The reason is that a backward secrecy of the output sequence $r_{t-3}, r_{t-2}, r_{t-1}, \ldots$ is required for enhanced backward secrecy, but not a backward secrecy of the sequence of internal states $S_{t-3}, S_{t-2}, S_{t-1}, \ldots$.

Continuing with the assumption that an attacker has been able to obtain the internal state $S_t$ at the time instant t, four cells of the predecessor internal state $S_{t-1}$ are unknown to the attacker. For their assignment there are $2^4=16$ possibilities. When testing all these possibilities there will be exactly one that produces the known internal state $S_t$. Accordingly, the enhanced backward secrecy is given in this case with a strength of $2^4=16$ computation steps which provides a certain—admittedly relatively low—obstacle.

Of course, this is only an example. For other stream ciphers, other values may be applicable. In particular, the number of feedback shift registers is typically higher than four.

Hence, FIG. 10 schematically illustrates one possible implementation of a random bit stream generator that may be used as a stream cipher or as a (deterministic) random number generator. The random bit stream generator comprises a plurality of feedback shift registers 1010-1 to 1010-4 that are configured to store a plurality of bit values that represent the internal state of the random bit stream generator. Each of the feedback shift registers comprises a register input (referred to above as the "last cell") and a register output (referred to above as the "foremost cell"). The random bit stream generator further comprises a Boolean output function 550 configured to receive the plurality of register outputs from the plurality of feedback registers 1010-1 to 1010-4. The Boolean output function 550 is further configured to perform a first Boolean combination of the plurality of register outputs and to provide a corresponding output bit. A plurality of successive output bits form the random bit stream. The random bit stream generator also comprises a feedback loop 1080 configured to perform a second Boolean combination of the output bit with at least one register feedback bit of at least one of the feedback shift registers 1010-1 to 1010-4, so that the register input of the at least one feedback shift register is a function of the output bit.

The random bit stream generator as schematically illustrated in FIG. 10 may also be described as follows. The random bit stream generator comprises an internal state memory 1010-1 to 1010-4 which is configured to store an internal state of the random bit stream generator. The random bit stream generator further comprises an output function 550 configured to use at least a portion of a current internal state for determining a current output bit of the random bit stream. The portion of the current internal state that is used for determining the current output bit may be, for example, the foremost cells of the four shift registers 1010-1 to 1010-4. Furthermore, the random bit stream generator comprises an internal state modifier which is configured to modify the internal state using at least another portion of the current internal state and also the current output bit of the random bit stream. The other portion of the current internal state may comprise selected cells of the various shift registers 1010-1 to 1010-4. Typically, each of the (N)LFSR 1010-1 to 1010-4 performs a "self-contained" feedback that only uses a subset of the cells of the respective shift register and no cells of any one of the other shift registers. The current output bit of the random bit stream may also be used for modifying the internal state. Note that the output function 550 may comprise a delay so that the current output bit of the random bit stream actually would be related to a preceding internal state of the random bit stream generator.

The plurality of shift registers 1010-1 to 1010-4 are one of several possible examples for a means for storing a plurality of bit values that represent an internal state of the random bit stream generator. The output function 550 is one of several possible examples of a means for determining successive output bits of the random bit stream on the basis of a Boolean combination of a portion of the bit values that represent the internal state. The feedback loop or internal state modifier 1080 is one of several possible examples of a means (or a part thereof) for updating the internal state on the basis of a current one of the successive output bits of the random bit stream and a current internal state of the random bit stream generator.

While the classic stream cipher typically guarantees a large period when operated in the normal mode (keystream mode), provided the shift registers are suitably chosen (in this case a formula or lower bound for the period length can be proved), this is not true for the keystream feedback mode of a classic stream cipher. Thus, in the keystream feedback mode of the classic stream cipher smaller periods may occur.

According to some embodiments, the keystream (the output bit of the random bit stream) is not fed back to all of the shift registers, but only to some. For example, the random bit stream is fed back to all but one of the shift registers. In this case, those shift registers to which the random bit stream is not fed back guarantee a minimum period length. This is schematically illustrated in FIG. 11.

Figure 11:
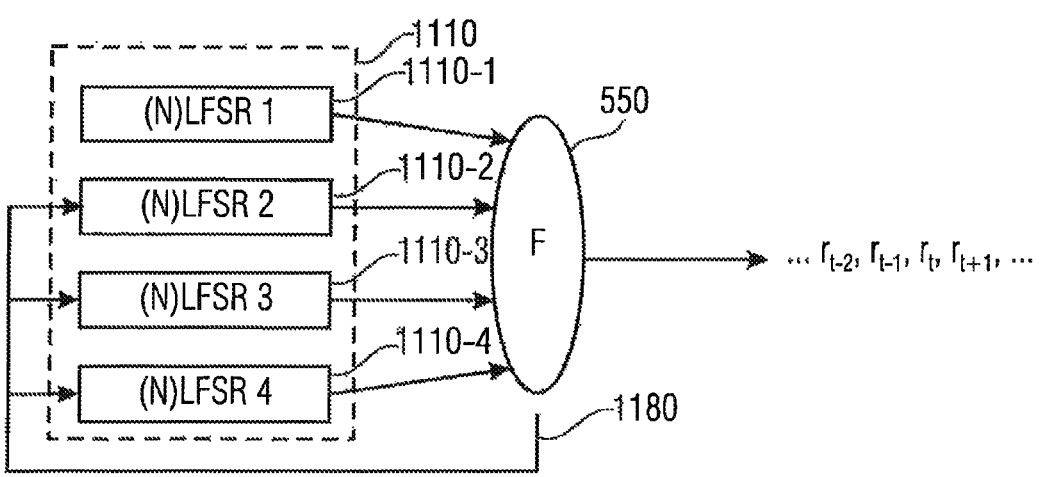
FIG. 11 shows a schematic block diagram of a random bit stream generator according to embodiments and implemented as a feedback shift register-based stream cipher in keystream feedback mode with guaranteed minimal period.

FIG. 11 shows a schematic block diagram of a random bit stream generator (e.g., a stream cipher) according to at least one embodiment. The random bit stream generator comprises an internal state memory 1110. The internal state memory 1110 comprises four linear feedback shift registers 1110-1, 1110-2, 1110-3, and 1110-4. As an alternative, the feedback shift registers may be non-linear feedback shift registers. Of course, another number than four feedback shift registers 1110-1 to 1110-4 is also possible.

The new output bit of the random bit stream is determined by the output function 550 on the basis of a Boolean combination of the bit sequence portion and a first internal state portion of the current internal state (i.e., the first internal state portion is typically a subset of the bit values that constitute the internal state, for example the bit values of the output cells of the feedback shift registers 1110-1 to 1110-4).

The random bit stream generator shown in FIG. 8 comprises a feedback arrangement 1180 which is used to feed the new output bit back to the internal state memory 1110 by performing a Boolean combination which involves the new output bit of the random bit stream as determined by the output function 550 and a second internal state portion of the current internal state. A next internal state of the random bit stream generator is in this manner determined by feeding the result(s) of the Boolean combination to the input bits of those feedback shift registers which are connected to the feedback arrangement 1180.

In case the shift register 1110-1, to which the output bit of the random bit stream is not fed back, is maximally periodic and has the length L, then the minimal period of the generated pseudo random sequence (the random bit stream produced by the output function 550) is at least $2^L-1$.

Figure 12:
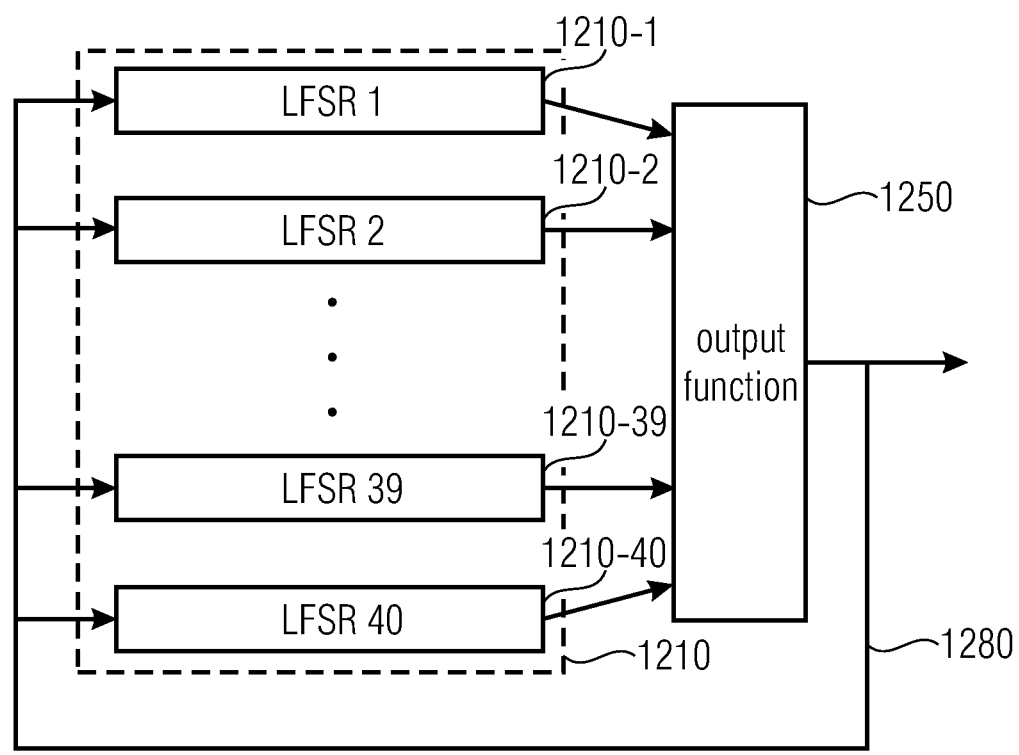
FIG. 12 shows a schematic block diagram of a random bit stream generator according to embodiments.

FIG. 12 schematically shows a further embodiment by way of illustration. The random bit stream generator schematically shown in FIG. 12 comprises an internal state memory 1210 which in turn comprises forty linear feedback shift registers 1210-1 to 1210-40. The random bit stream generator further comprises an output function 1250 and a feedback arrangement 1280. The feedback arrangement 1280 is connected to the linear feedback shift registers 1210-1 to 1210-40 of the internal state memory 1210, but not to the linear feedback shift register 1210-1. In other words, the plurality of feedback shift registers are divided into two non-empty subsets. A first subset comprises the linear feedback shift register 1210-1. A second subset comprises the linear feedback shift registers 1210-2 to 1210-40. The feedback shift register(s) 1210-1 in the first subset have a function similar to the function of the periodic bit sequence generator 860 shown in FIG. 8.

Figure 13:
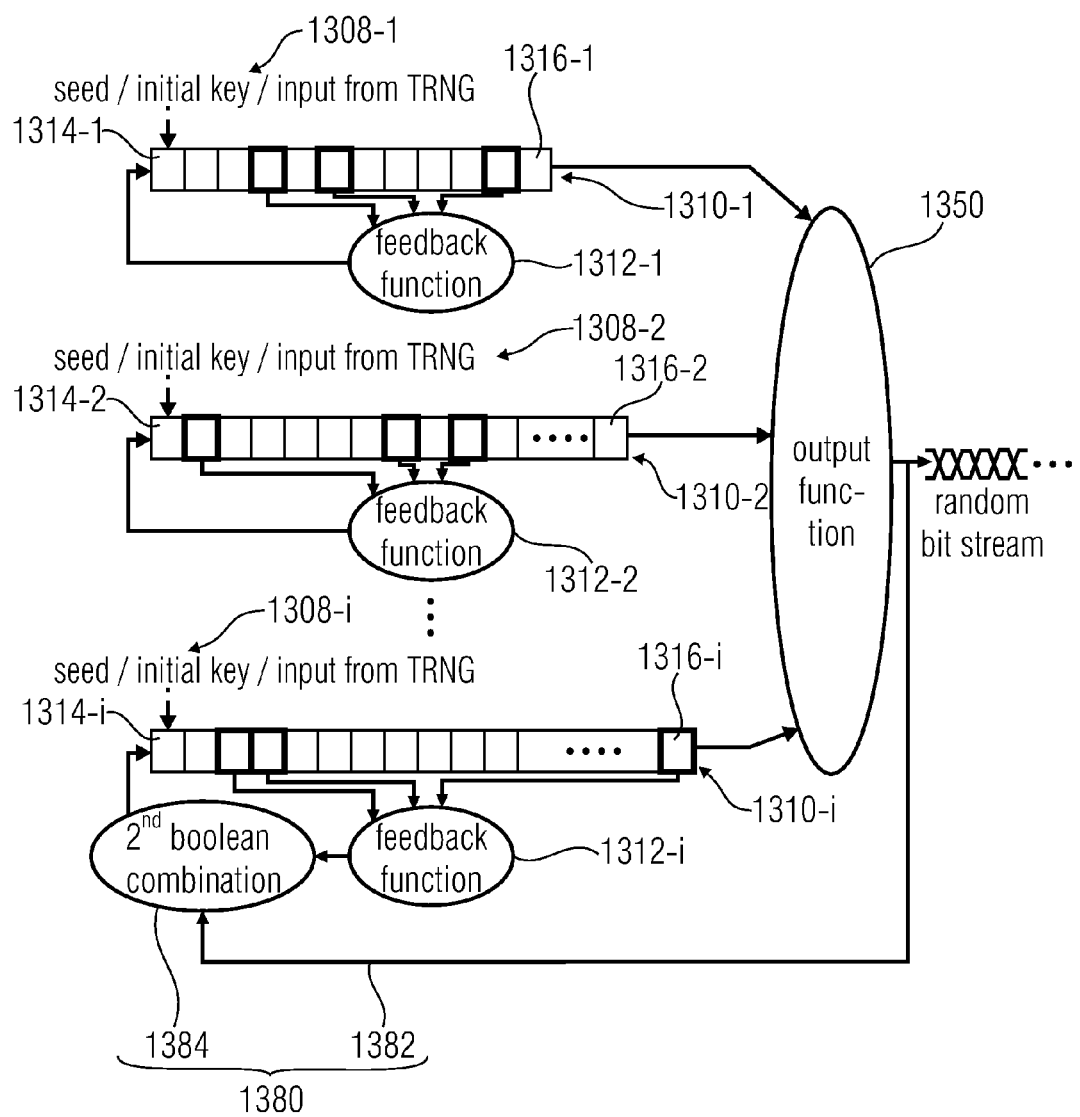
FIG. 13 shows a schematic block diagram of a random bit stream generator according to embodiments.

FIG. 13 shows a schematic block diagram of a random bit stream generator according to embodiments. The random bit stream generator comprises a plurality of feedback shift registers 1310-1, 1310-2, . . . , 1310-$i$. Each of the plurality of feedback shift registers 1310-1 to 1310-$i$ comprises a feedback function 1312-1, 1312-2, . . . , 1312-$i$. Each feedback function is configured to determine the register feedback bit of the corresponding feedback shift register on the basis of a Boolean combination of selected bit values stored by the corresponding feedback shift register 1310-1 to 1310-$i$. In FIG. 13, the three illustrated feedback shift registers 1310-1 to 1310-$i$ comprise the respective register feedback bits 1314-1, 1314-2 and 1314-$i$. The cells of the feedback shift registers 1310-1 to 1310-$i$ corresponding to the selected bit values are indicated in FIG. 13 by thick outlines.

The random bit stream generator comprises a (Boolean) output function 1350. The output function 1350 may also be regarded as a means for determining successive output bits of the random bit stream on the basis of a (Boolean) combination of a portion of the bit values that represent the internal state, e.g., the output bits 1316-1, 1316-2, . . . , 1316-$i$ of the shift registers 1310-1 to 1310-$i$.

The feedback loop 1380 comprises a connection 1382 between an output of the output function 1350 and an input of a second Boolean combination 1384. Another input for the second Boolean combination 1384 is provided by the feedback function 1312-$i$ of the i-th shift register 1310-$i$. An output of the second Boolean function 1384 is fed to the input bit 1314-$i$ of the shift register 1310-$i$. In this manner the output bit is combined with at least one register feedback bit (provided at the output of the feedback function 1312-$i$) of at least one of the feedback shift registers (namely the feedback shift register 910-$i$), so that the register input 1314-$i$ of the at least one feedback shift register 1310-$i$ is a function of the output bit.

The feedback shift registers 1310-1 to 1310-($i$−1) that are not connected to the feedback arrangement have a similar function as the periodic bit sequence generator 860 of the embodiment shown in FIG. 8, namely that of guaranteeing a minimum period length for the random bit stream generated by the random bit stream generator. The feedback arrangement 1380 is configured to provide the new bit stream value to the feedback function(s) of at least one (in FIG. 13: feedback shift register 1310-$i$) of the plurality of feedback shift registers 1310-1 to 1310-$i$ as an additional input, but not to the feedback function(s) of at least one other feedback shift register (in FIG. 13: feedback shift registers 1310-1 to 1310-$i$) of the plurality of feedback shift registers 1310-1 to 1310-$i$.

According to embodiments at least one of the plurality of feedback shift registers 1310-1 to 1310-$i$ or even all feedback shift registers may be a linear feedback shift register. Alternatively, at least one of the plurality of feedback shift registers or all of them may be a non-linear feedback shift register. Yet another option would be that some of the feedback shift registers are linear feedback shift registers and the remaining feedback shift registers are non-linear feedback shift registers.

As schematically indicated in FIG. 13, at least two of the plurality of feedback shift registers 1310-1 to 1310-$i$ may have different lengths.

The second Boolean combination 1374 performed by the feedback loops 1380 may be an exclusive OR-combination of the output bit and the register feedback bit of the at least one feedback register.

The random bit stream generator may further comprise a state initializer configured to initialize the internal state of the feedback shift registers 1310-1 to 1310-$i$ on the basis of a seed information, an initial key or an input from a TRNG. The respective seeds/initial keys/inputs 1308-1, 1308-2, . . . , 1308-$i$ from TRNG are schematically illustrated in FIG. 13. As mentioned above, entropy may be reloaded to the internal state by feeding an external input 1308-1 to 1308-$i$ to the input bits 1314-1 to 1314-$i$ of the shift registers 1310-1 to 1310-$i$. In embodiments, the state initializer may comprise a logical initializing function configured to receive the seed information (or the initial key(s) or the input(s) from TRNG) 1308-1 to 1308-$i$ as an input and to load the plurality of feedback shift registers with the bit values representing an initial state of the random bit stream generator that is associated to the seed information (or initial key or input from TRNG).

According to embodiments, the internal state memory 510, 1310 may comprise a plurality of feedback shift registers 1310-1 to 1310-$i$ and the feedback arrangement 1380 may comprise a plurality of Boolean functions 1384 corresponding to the plurality of feedback shift registers and configured to provide feedback bits to a plurality of corresponding input bits 1314-1 to 1314-$i$ of the plurality of feedback shift registers, at least one of the plurality of Boolean functions 1384 being configured to receive and use the new output bit for determining the corresponding feedback bit 1314-$i$.

According to embodiments the periodic bit sequence generator 860 may comprise a feedback shift register.

According to embodiments the plurality of feedback shift registers 1310-1 to 1310-$i$ may have at least two different lengths.

According to embodiments at least one of the plurality of feedback shift registers 1310-1 to 1310-$i$ may be a nonlinear feedback shift register.

According to embodiments the periodic bit sequence generator 860 may be a maximum length sequence generator so that the periodic bit sequence is a maximum length sequence.

According to embodiments the periodic bit sequence generator 860 may be a part of the internal state memory 510, wherein an input to the periodic bit sequence generator 860 being independent from the new output bit provided by the output function. Accordingly, an internal state of the periodic bit sequence generator is not a function of (and thus independent from) the new output bit of the random bit stream.

According to embodiments the internal state memory 510, 1310 may comprise a plurality of feedback shift registers 1310-1 to 1310-$i$ configured to store the current internal state, at least one of which being provided for the periodic bit sequence generator 860, 1310-1 to 1310-($i$−1). An output of the feedback arrangement may be connected to inputs of feedback functions 1314-$i$ of the plurality of the feedback shift registers 1310-1 to 1310-$i$, with the exception of the at least one feedback shift register (for example, in FIG. 13, the feedback shift registers 1310-1 to 1310-($i$−1)) that is provided for the periodic bit sequence generator.

According to embodiments the random bit stream generator may further comprise a seed information loader 1308-1 to 1308-I configured to load a seed information into the internal state memory 1310 that defines an initial internal state of the random bit stream generator.

According to embodiments the random bit stream generator may be a stream cipher generator, a random number generator, a deterministic random number generator, or a part of a hybrid random number generator.

Figure 14:
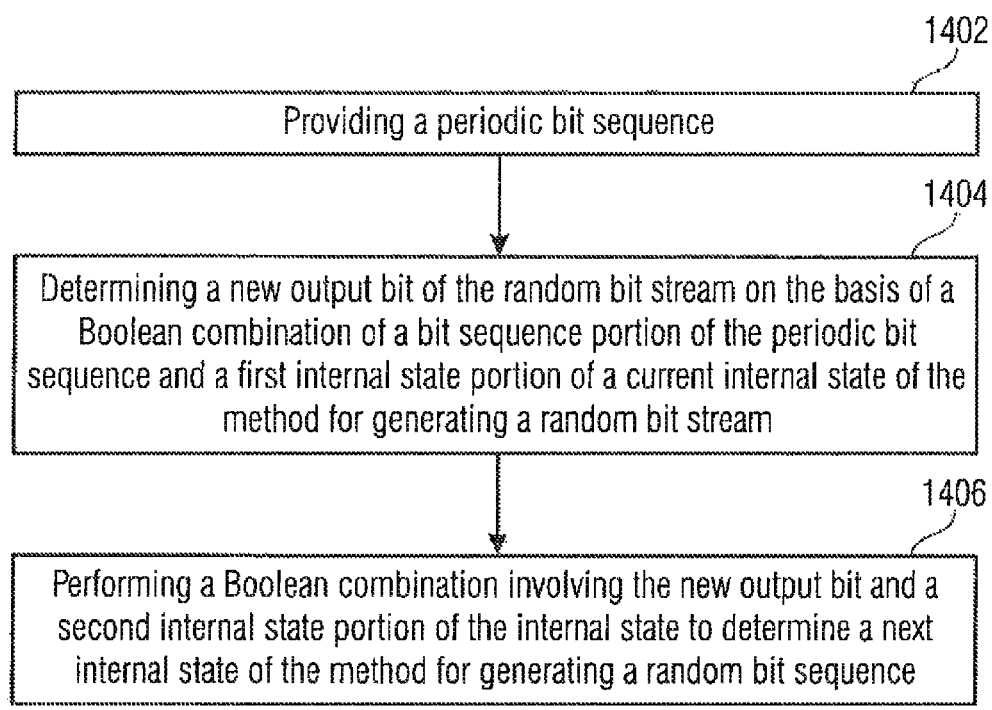
FIG. 14 shows a schematic flow diagram of a method for generating a random bit stream according to embodiments.

FIG. 14 shows a schematic flow diagram of a method for generating a random bit stream according to embodiments. The method comprises a step 1402 during which a periodic bit sequence or a portion of a periodic bit sequence is provided. The (portion of the) periodic bit sequence may typically be provided by a periodic bit sequence generator. The step 1402 of providing the periodic bit sequence may be configured to provide a maximum length bit sequence. Additionally or alternatively, the step 1402 of providing the periodic bit sequence may be independent from any output bit preceding the new output bit.

At a step 1404 of the method according to the schematic flow diagram of FIG. 14, a new output bit of the random bit stream is determined. The determination of the new output bit is done on the basis of a Boolean combination of a bit sequence portion of the periodic bit sequence and a first internal state portion of a current internal state of the method for generating a random bit stream.

A Boolean combination is then performed at a step 1406 of the method for generating a random bit stream according to embodiments. The step 1406 of performing the Boolean combination involves the new output bit and a second internal state of the internal state. As a result of the Boolean combination a next internal state of the method for generating a random bit sequence is determined. According to some embodiments, this determination of the next internal state may comprise feeding a result of performing the Boolean combination involving the new output bit and the second internal state portion to a plurality of input bits of a plurality of feedback shift registers that are used for storing the internal state.

Figure 15:
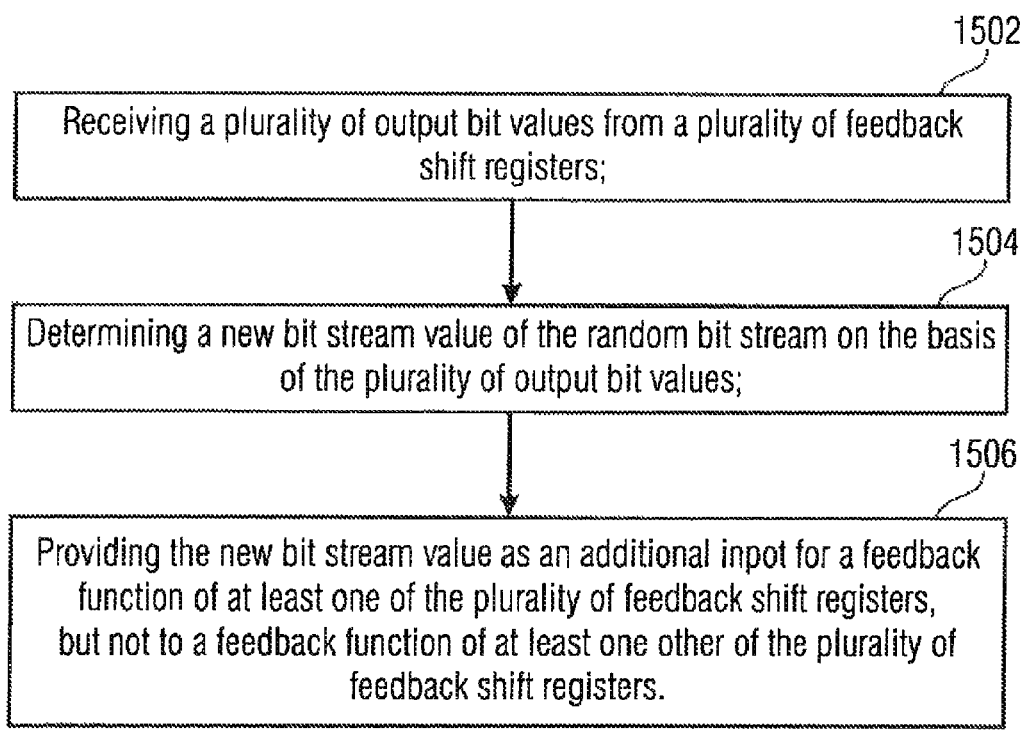
FIG. 15 shows a schematic flow diagram of a method for generating a random bit stream according to further embodiments.

FIG. 15 shows a schematic flow diagram of a method for generating a random bit stream according to further embodiments. The method comprises a step 1502 of receiving a plurality of output bit values from a plurality of feedback shift registers. The method further comprises a step 1504 of determining a new bit stream value of the random bit stream on the basis of the plurality of output bit values. At a step 1506 of the method for generating the random bit stream, the new bit stream value is provided as an additional input for a feedback function of at least one of the plurality of feedback shift registers, but not to a feedback function of at least one other of the plurality of feedback shift registers.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

In the foregoing Detailed Description, it can be seen that various features are grouped together in embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Furthermore, in some embodiments a single step may include or may be broken into multiple sub steps. Such sub steps may be included and part of the disclosure of this single step unless explicitly excluded.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A random bit stream generator for generating a random bit stream, the random bit stream generator comprising:
   an internal state memory configured to store a current internal state of the random bit stream generator;
   a periodic bit sequence generator configured to provide a periodic bit sequence;
   an output function configured to receive a bit sequence portion of the periodic bit sequence and a first internal state portion of the current internal state, and to determine a new output bit of the random bit stream on the basis of a Boolean combination of the bit sequence portion and the first internal state portion;
   a feedback arrangement configured to feed the new output bit back to the internal state memory by performing a Boolean combination involving the new output bit and a second internal state portion of the current internal state to determine a next internal state of the random bit generator.

2. The random bit stream generator according to claim 1, wherein the internal state memory comprises a plurality of feedback shift registers and wherein the feedback arrangement comprises a plurality of Boolean functions corresponding to the plurality of feedback shift registers and configured to provide feedback bits to a plurality of corresponding input bits of the plurality of feedback shift registers, at least one of the plurality of Boolean functions being configured to receive and use the new output bit for determining the corresponding feedback bit.

3. The random bit stream generator according to claim 2, wherein the periodic bit sequence generator comprises a feedback shift register.

4. The random bit stream generator according to claim 2, wherein the plurality of feedback shift registers have at least two different lengths.

5. The random bit stream generator according to claim 2, wherein at least one of the plurality of feedback shift registers is a nonlinear feedback shift register.

6. The random bit stream generator according to claim 1, wherein the periodic bit sequence generator is a maximum length sequence generator so that the periodic bit sequence is a maximum length sequence.

7. The random bit stream generator according to claim 1, wherein the periodic bit sequence generator is a part of the internal state memory, wherein an input to the periodic bit sequence generator being independent from the new output bit provided by the output function.

8. The random bit stream generator according to claim 7, wherein the internal state memory comprises a plurality of feedback shift registers configured to store the current internal state, at least one of which being provided for the periodic bit sequence generator, and wherein an output of the feedback arrangement is connected to inputs of feedback functions of the plurality of the feedback shift registers, with the exception of the at least one feedback shift register that is provided for the periodic bit sequence generator.

9. The random bit stream generator according to claim 1, further comprising a seed information loader configured to load a seed information into the internal state memory that defines an initial internal state of the random bit stream generator.

10. The random bit stream generator according to claim 1, wherein the random bit stream generator is a stream cipher generator.

11. A random bit stream generator for generating a random bit stream, the random bit stream generator comprising:

a plurality of feedback shift registers, each feedback shift register comprising an input bit, an output bit, and a feedback function linking a portion of the bits of the feedback shift register to the input bit, so that the plurality of feedback shift registers provides a plurality of input bits, a plurality of output bits, and a plurality of feedback functions;

an output function configured to receive a plurality of output bit values from the plurality of output bits, and to determine a new bit stream value on the basis of the plurality of output bit values; and a feedback arrangement configured to provide the new bit stream value to the feedback function of at least one of the plurality of feedback shift registers as an additional input, but not to the feedback function of at least one other feedback shift register of the plurality of feedback shift registers, wherein the feedback arrangement comprises a plurality of Boolean functions corresponding to the plurality of feedback shift registers excluding the at least one other feedback shift register, and configured to provide feedback bits to a plurality of corresponding input bits of the plurality of feedback shift registers, at least one of the plurality of Boolean functions being configured to receive and use the new bit stream value for determining the corresponding feedback bit.

12. The random bit stream generator according to claim 11, wherein the at least one other of the plurality of feedback shift registers is a maximum length feedback shift register having a specific periodicity so that the random bit stream has a stream periodicity equal to or greater the said specific periodicity.

13. The random bit stream generator according to claim 11, wherein the plurality of feedback shift registers have at least two different register lengths.

14. The random bit stream generator according to claim 11, wherein the at least one other feedback register is configured to assure a minimum periodicity of the random bit stream.

15. The random bit stream generator according to claim 11, further comprising a seed information loader configured to load a seed information into the plurality of feedback shift registers that defines an initial internal state of the plurality of feedback shift registers.

16. The random bit stream generator according to claim 11, wherein at least one of the feedback shift registers is a non-linear feedback shift register.

17. The random bit stream generator according to claim 11, wherein the random bit stream generator is a stream cipher generator.

18. A method for generating a random bit stream, the method comprising:

providing a periodic bit sequence;

determining a new output bit of the random bit stream on the basis of a Boolean combination of a bit sequence portion of the periodic bit sequence and a first internal state portion of a current internal state of the method for generating a random bit stream;

performing a Boolean combination involving the new output bit and a second internal state portion of the internal state to determine a next internal state of the method for generating a random bit sequence.

19. The method according to claim 18, wherein a determination of the next internal state comprises feeding a result of performing the Boolean combination involving the new output bit and the second internal state portion to a plurality of input bits of a plurality of feedback shift registers that are used for storing the internal state.

20. The method according to claim 18, wherein the step of providing the periodic bit sequence is configured to provide a maximum length bit sequence.

21. The method according to claim 18, wherein the step of providing the periodic bit sequence is independent from any output bit preceding the new output bit.

22. A computer readable digital storage medium having stored thereon a computer program having a program code for performing, when running on a computer, a method for generating a random bit stream, the method comprising:

providing a periodic bit sequence;

determining a new output bit of the random bit stream on the basis of a Boolean combination of a bit sequence portion of the periodic bit sequence and a first internal state portion of a current internal state of the method for generating a random bit stream;

performing a Boolean combination involving the new output bit and a second internal state portion of the internal state to determine a next internal state of the method for generating a random bit sequence.

23. A method for generating a random bit stream, the method comprising:

receiving a plurality of output bit values from a plurality of feedback shift registers;

determining a new bit stream value of the random bit stream on the basis of the plurality of output bit values;

combining, by means of a Boolean function, the new bit stream value with an output of a feedback function of at least one of the plurality of feedback shift registers, but not with a feedback function of at least one other of the plurality of feedback shift registers; and providing a result of the Boolean function as a register input to the at least one feedback shift register.

* * * * *